United States Patent [19]

Gaberson

[11] 3,916,704
[45] Nov. 4, 1975

[54] VIBRATORY LOCOMOTION MEANS

[75] Inventor: Howard A. Gaberson, Oxnard, Calif.

[73] Assignee: The United States of America as represented by the Secretary of the Navy, Washington, D.C.

[22] Filed: Apr. 23, 1973

[21] Appl. No.: 353,282

[52] U.S. Cl. ............................... 74/84 R; 180/54 R
[51] Int. Cl.² ........................................... F03G 3/00
[58] Field of Search .............. 185/4, 27, 29; 60/668; 74/84, 84 S; 180/54, 7 R

[56] References Cited
UNITED STATES PATENTS

| | | | |
|---|---|---|---|
| 3,203,644 | 8/1965 | Kellogg, Jr. ............................ | 74/84 |
| 3,555,915 | 1/1971 | Young, Jr. ............................ | 74/84 S |
| 3,750,484 | 8/1973 | Benjamin .............................. | 74/84 |
| 3,810,394 | 5/1974 | Novak ................................... | 74/84 S |

FOREIGN PATENTS OR APPLICATIONS

| | | | |
|---|---|---|---|
| 704,568 | 3/1965 | Canada ................................. | 74/84 S |
| 115,928 | 1/1930 | Germany .............................. | 74/84 S |

*Primary Examiner*—Allen M. Ostrager
*Attorney, Agent, or Firm*—Richard S. Sciascia; Joseph M. St.Amand; David O'Reilly

[57] ABSTRACT

A vibratory locomotion device which consists of one or more skids resting on the ground supporting a payload, and a vibrating mass attached to the skid. The mass, operated by a motor which creates a sinusoidal oscillation, alternatively pulls and pushes on the skid at a predetermined angle to the ground as it vibrates. When the mass is at the top of its stroke, it lifts and pulls forward on the skid and, when it is at the bottom of its stroke, it pushes downward and backward on the skid. Since the downward force increases the normal and, hence, the available friction force, the angle of the mass to the ground can be adjusted so that no backward slide results. As a result of the vibration of the mass, the skid incremently shuffles forward along the ground.

22 Claims, 15 Drawing Figures

VIBRATORY LOCOMOTION MEANS

BACKGROUND OF THE INVENTION

1. Field of the Invention

This invention relates generally to propulsion devices and more particularly to propulsion by vibrating locomotion devices.

2. Description of the Prior Art

In order to provide an efficient and useful vibratory locomotion device, cumbersome weight and space penalties must be overcome. Further, due to the vibrations, problems with maintenance of equipment and discomfort to riders must also be solved. The present invention provides solutions to these problems by producing a relatively smooth shuffling type of locomotion of a device having reasonable space and weight limitations.

There is a history of vibratory locomotion. For example, pogo sticks bounce up and down and accomplish locomotion, and automatic washing machines provide locomotion of a sort by walking across the laundry floor with an unbalanced load during the spin cycle. Several vibratory compactors for soils have been fabricated and analyzed that also accomplish locomotion. However, the land locomotion capability of these devices was minimal since the impact was the main effect sought. Hopping and jumping vehicles have been proposed and tested, but these are even less similar to the invention disclosed herein.

There are varying types of land locomotion devices which appear similar to the present invention but which, in effect, are actually fundamentally different. These locomotion devices have propulsion systems which may be defined as rachet drives, quick-return devices and catfish drives.

The rachet drive system contains some means of attaining two coefficients of friction. It must have a low coefficient of friction when sliding in the forward direction and a high coefficient of friction when sliding in the rearward direction. The differential coefficients of friction are attained in a number of ways: backward leaning serrations; flaps that dig into the ground in one direction; or bristles leaning backwards.

The impact or quick-return drive means is a device in which a mass is oscillated non-sinusoidally. That is, with a different peak acceleration in the fore direction from the aft direction, we can get a net forward motion.

The catfish drive is named after the land locomotion catfish which somewhat swims along the ground with its fins alternately digging into the ground and dragging the body along. The locomotion is similar to rowing a skiff with alternate strokes. The catfish drive is therefore a case in which the vehicle rests substantially its entire weight on a sliding surface (or wheels) and is pushed forward by one or more levers or feet.

SUMMARY OF THE INVENTION

The purpose of the present invention is to provide a vibratory locomotion device which operates smoothly and efficiently to exhibit powerful characteristics.

With vibratory locomotion, as it has been termed, the whole vehicle being driven is supported on a sliding surface that has a completely equal resistance to friction in both the fore and aft directions. A substantial mass is oscillated in a direction inclined to the vertical sufficiently to substantially lift the whole vehicle in the desired direction, once each cycle. The mass oscillates sinusoidally with equal peal acceleration in the fore and aft direction. The motion of the mass is in a two-dimensional arc or straight line. It is only because the mass actually lifts the whole vehicle, thereby reducing the friction to near zero that an efficient net forward locomotion is accomplished. The vehicle slides forward in a shuffling motion each time it is lifted. On the rearward stroke, the vehicle is pressing down on the ground with a force equal to the vehicle weight; thus the vehicle and mass together push down with a force almost doubling the gross vehicle weight. This important feature enables the device to exhibit efficient and powerful characteristics not contemplated by the prior art.

There are a number of suitable arrangements for driving the mass. Internal combustion engines, hydraulic motors and compressed air were found suitable to oscillate the mass through link, crank, rod and various spring arrangements as will be more fully discussed hereinafter. It is important to note that the problems discussed above were solved by using particular sinusoidal oscillations of the mass and a low mass weight to gross vehicle weight ratio, which are both fundamentally new.

OBJECTS OF THE INVENTION

Accordingly, it is one object of the present invention to provide a vehicle with vibratory locomotion which is smooth and efficient.

Another object of the present invention is to provide a vehicle with vibratory locomotion by sinusoidal oscillation of a mass.

Yet another object of the present invention is to provide a vehicle with vibratory locomotion by a mass having low ratio of mass weight to gross vehicle weight.

Still another object of the present invention is to provide vibratory locomotion for a vehicle having equal resistance to friction in both the fore and aft directions.

Yet still another object of the present invention is to provide a vehicle with vibratory locomotion by oscillating a mass, inclined to the vertical, sufficiently to lift the vehicle, thereby reducing the friction in the forward direction to near zero, thus producing a net forward locomotion.

Still further, another object of the present invention is to provice a vehicle with vibratory locomotion by oscillating a mass inclined to the vertical such that the vehicle and mass press downward during the rearward stroke with a force almost equal to double the gross vehicle weight, thus preventing any backward motion.

Other objects, advantages and novel features of the invention will become apparent from the following detailed description of the invention when considered in conjunction with the accompanying drawings in which like reference numbers identify like parts throughout the drawings.

BRIEF DESCRIPTION OF THE DRAWINGS

FIG. 19 is a side elevation of a hydraulic oscillating mode of the invention.

DETAILED DESCRIPTION OF THE PREFERRED EMBODIMENT

Figure 1:
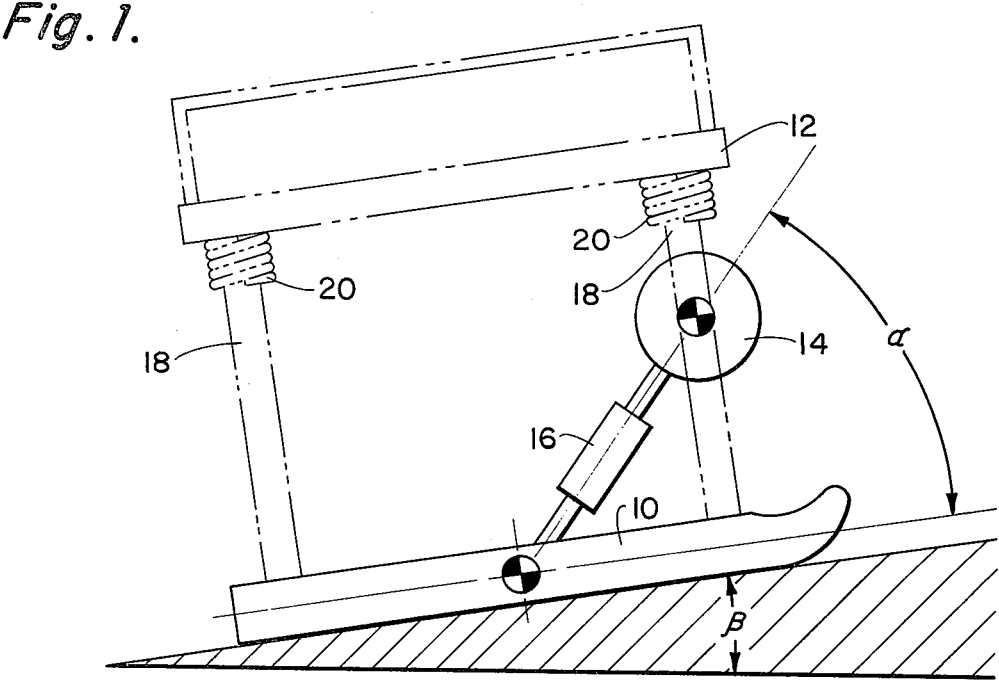
FIG. 1 is a side elevation illustrating the principles of the invention in schematic form.

Vibratory locomotion is a means for accomplishing land locomotion by vibration. The specific means disclosed here consists of a vehicle with at least one skid 10 resting on the ground supporting a payload, such as a platform 12 (shown in phantom) and a vibrating mass 14 attached to the skid 10 as shown in FIG. 1. The skid 10 may be made of a wear resistant material such as wood, rubber, metal or the like. The mass oscillates in a substantially straight line with a direction, $\alpha$, to the ground surface and it alternately pulls and pushes on the skid 10 in the direction, $\alpha$, as it vibrates. When the mass 14 is at the top of its stroke, it lifts and pulls the vehicle forward. Near the bottom of its stroke, the mass 14 pushed backward and downward on the skid 10, but since the downward force component increases the normal and, hence, the available friction force, the angle, $\alpha$, can be adjusted so that no backward slide results. As the result of the vibration of the mass, the skid 10, and, hence, the vehicle, incrementally shuffle forward along the ground.

An oscillator 16, attached to the skid 10 and also to the mass 14, causes the mass 14 to oscillate sinusoidally, at a predetermined frequency, in the direction indicated. An optimum frequency is used to avoid the destructive effect of vibrations on the vehicle and components and to avoid discomfort to the rider. Legs 18 attached to the skid support springs 20, which in turn support the payload platform 12. In this way, suitably sized springs isolate the payload platform from vibration. The frequency selected keeps the vehicle just below a bouncing or a flight mode. This is because the object here is not for the purpose of impacting but to provide a smooth, forward motion of the vehicle. Thus, frequencies over approximately 10 cycles per second have been found not to be suitable.

As the mass 14 oscillates back and forth, the momentary upward pull reduces the frictional force beneath the skid 10 such that the vehicle is moved to the right. Conversely, as the mass 14 is at the bottom of its stroke, it is pushing down and to the left on the skid 10. This upward push increases the friction force and the platform has a much reduced tendency to move backward. The net affect of the inertia forces due to the oscillation of the mass 14 is a displacement of the skid 10 to the right. Thus, the vehicle shuffles along the ground.

Control of such a vehicle can be accomplished in a number of ways. The angle, $\alpha$, between the oscillation direction and the horizontal, as shown in FIG. 1, has a great effect on the net locomotion velocity as does the oscillation amplitude. A vehicle can be made with two long skids with one supporting the right half of the vehicle and the other supporting the left half. By altering the rate of advance of one skid or the other, turning can be accomplished. The oscillation angle can be reversed on one skid, which will cause the vehicle to turn with a minimum radius. The vehicle is pulled along in the direction of the horizontal component of the oscillation direction; thus, by altering the direction of this component, even a sideways motion can be accomplished. The oscillating mass is generally approximately between 5 to 20% of the gross vehicle weight.

For practical purposes, we can explain the theory of operation of vibratory locomotion as follows:

Conceptually, as shown in FIG. 1, everything but the vibrating mass 14 is considered attached to a skid 10 of mass $m_1$. The skid 10 can slide over a terrain inclined to the horizontal an amount, $\beta$, under the influence of a coefficient of friction, $\mu$. A weight 14 of mass $m_2$ is vibrated substantially sinusoidally with amplitude, $a$, and frequency measured in radians per unit time, $\omega$, in a straight line inclined to the skid 10 at an angle, $\alpha$. The correct interpretation of the amplitude, $a$, is half of the peak to peak displacement of the weight 14 during an oscillation. The intensity of vibration amplitude, $A$, is given by:

$$A = \frac{a\omega^2 \sin \alpha}{g \cos \beta} \quad (1)$$

where
$a$ = amplitude
$\omega$ = frequency per unit of time (in radians)
$\alpha$ = the angle of inclination of the weight
$g$ = acceleration of gravity
$\beta$ = angle of terrain The relative mass is given by:

$$M = \frac{m_2}{m_1 + m_2} \quad (2)$$

where:
$m_1$ = mass of skid and attachments
$m_2$ = mass of the weight

Shuffling mode vibratory locomotion takes place when:
$$MA \leq 1.0 \quad (3)$$
When $m_2$ is vibrated such that:
$$MA > 1.0 \quad (4)$$
small flights occur once per cycle so long as:
$$MA < \sqrt{\pi^2 + 1} \approx 3.297. \quad (5)$$
If we take the motion of $m_2$, with respect to $m_1$ (represented by a direction $z$), to be given by:
$$z = a \sin \omega t \quad (6)$$
all motions of the skid 10 will be periodic with a period of:

$$T = \frac{2\pi}{\omega} \tag{7}$$

Figure 9:
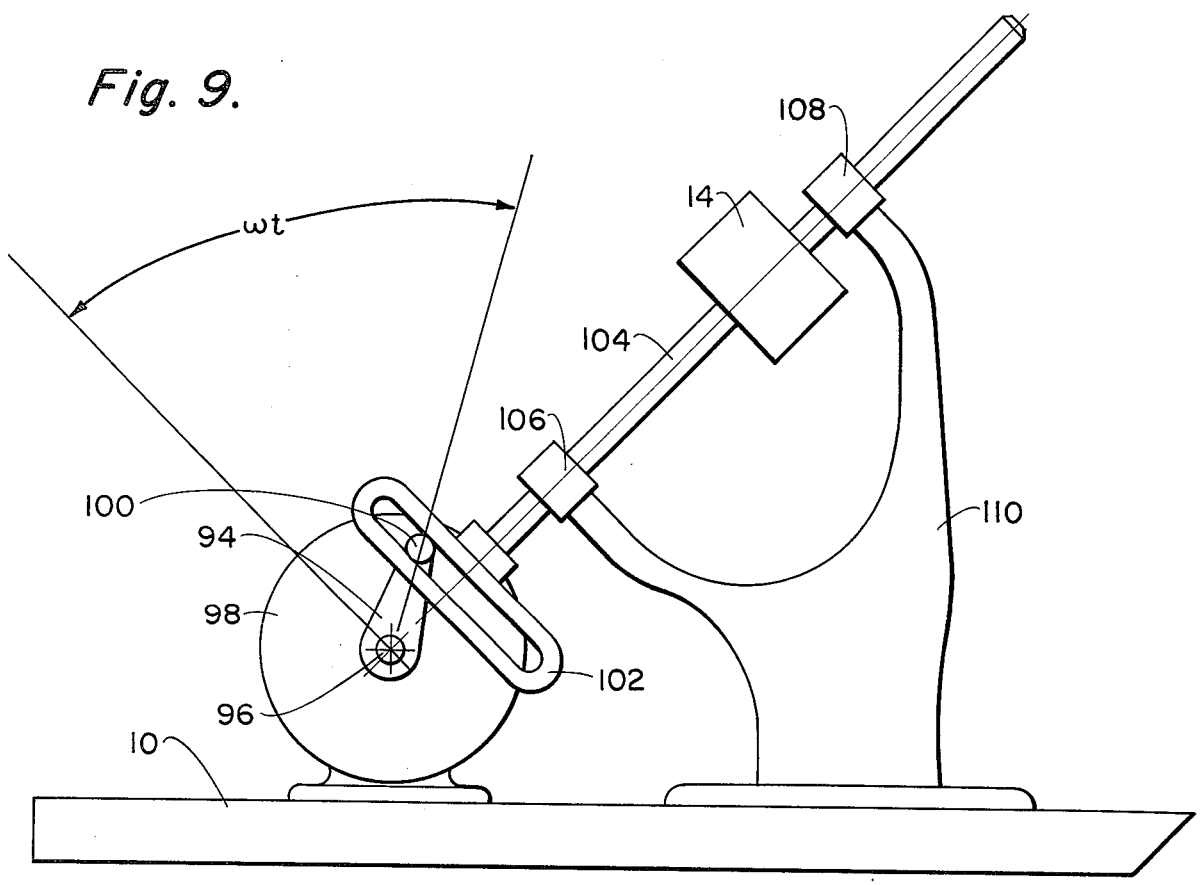
FIG. 9 is a side elevation in schematic form of a scotch yoke oscillating mode of the invention.

The relation of the angular quantity, $\omega t$, to the position of the vibratory mass can be made clear with reference to the scotch yoke oscillator in FIG. 9. When $\omega t$ is zero, the mass 14 is at its mean position. If we think of the angle, $\omega t$, measured in radians, sufficient values are considered if we limit out attention to a single typical cycle with values of $\omega t$ such that:

$$0 \leq \omega t \leq 2\pi \tag{8}$$

Figure 2:
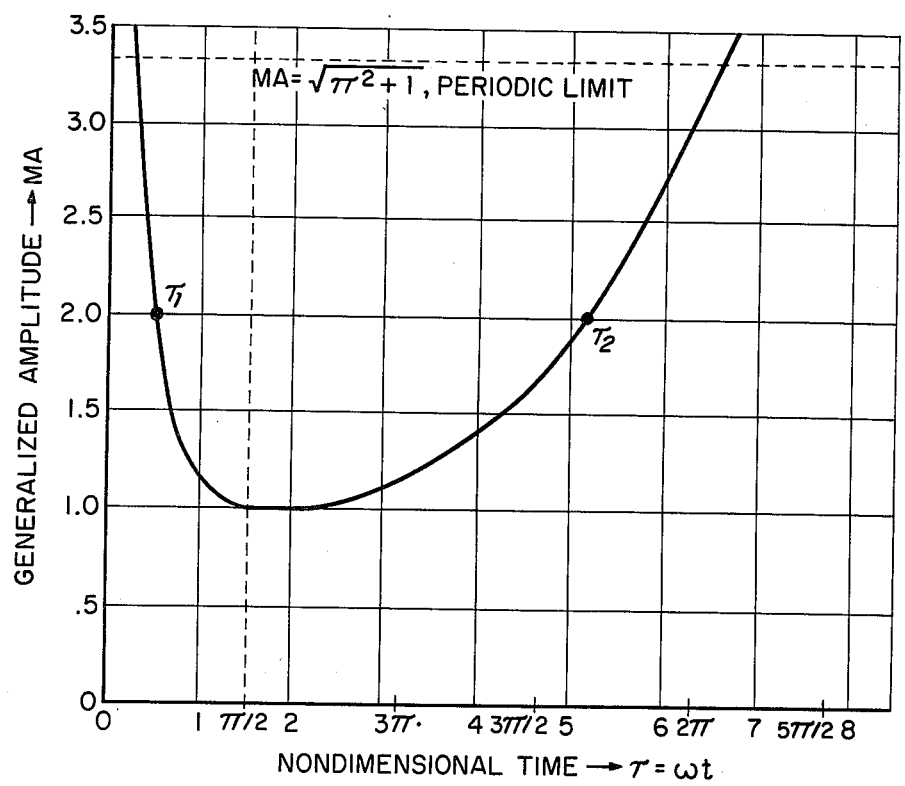
FIG. 2 is a graph illustrating the regimes of flight for various oscillation amplitudes with the product of the mass of the vehicle.

Various regimes of operation of vibratory locomotion can be distinguished by the value of quantity MA as is summarized below. The curve in the graph of FIG. 2 will give two values of $\omega t$, or $\tau$, between which flight will occur, for particular values of MA greater than 1.0 and less than 3.297, indicated by the dotted line on the graph. These two values of $\omega t$, indicated as $\tau_1$ and $\tau_2$ on the graph, respectively, represent the angle of the crank (see FIG. 9) when flight begins and when the flight ends for a value of MA of 2.0. Thus, the value of MA completely prescribes the flights as to beginning, end and duration.

Devices that are theoretically similar to the vibratory locomotion devices disclosed herein can be differentiated particularly with reference to MA. These devices require flight to develop impact and thus must operate such that flight occupies a substantial portion of the cycle. They operate with an MA in the region of approximately 3.0. A compactor is in this category. It is almost impossible to build a tractor capable of withstanding such impacts; therefore, they have not been accepted for widespread use. In contrast, the vibratory locomotion vehicle of the present invention does not need to be built to suffer such impacts because they are constructed to operate 90% of the time at values of MA less than unity. Consequently, they almost never achieve flight but achieve locomotion in a shuffling mode. Thus, there is little impact to damage equipment. Tests have shown that the highest drawbar pull is obtained with MA of less than unity (i.e., $MA < 1.0$).

Finally no vibratory locotion occurs until:

$$\phi MA > 1.0 \tag{9}$$

$$\phi = \frac{\mu + \cot \alpha}{\mu + \tan \beta} \tag{10}$$

where

A detailed theoretical analysis has been made and the resulting computations have been programmed for machine computation. A more complete presentation of the theory is not possible here but a more detailed theoretical analysis can be found in a paper entitled "Vibratory Locomotion" by H. A. Gaberson and P. L. Stone, Navel Civil Engineering Laboratory, Port Hueneme, California.

Figure 3:
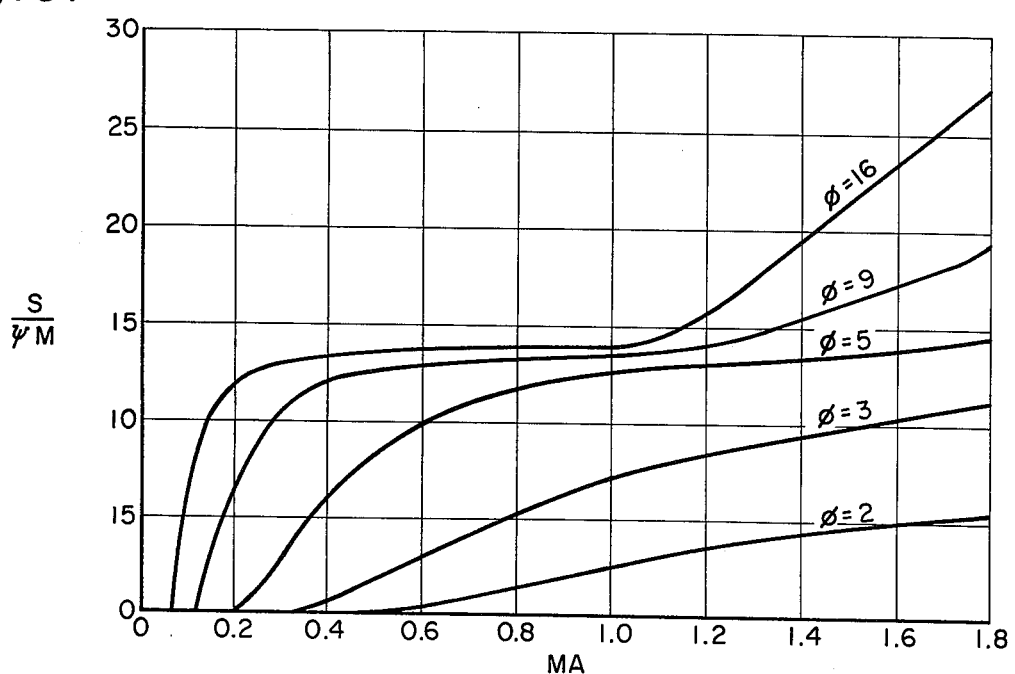
FIG. 3 is a chart illustrating the non-dimensionalized step size or net forward advance of the vibratory locomotion vehicle per cycle of mass oscillation.

The results of the programmed machine computations are conveniently summarized in the chart of FIG. 3. The chart yields the non-dimensionalized step size or the net forward advance per cycle of mass oscillation. To compute the cyclic advance for any given set of operating conditions one must calculate A from equation (1) and M from equation (2), and their produce (MA) formed. The value of $\phi$ is then determined from equation (10). Next, compute $\psi$ where:

$$\psi = \sin \alpha \, (\mu + \tan \beta) \tag{11}$$

With the computed values of MA and $\phi$, enter the design chart and determine the valve of $S/\psi$ M where S is the non-dimensional total cycle displacement.

With the value of S, the step size can be determined from:

$$S = \frac{d}{a} \text{ or } d = aS \tag{12}$$

where $d = $ the actual displacement of each cycle of oscillation;

$a = $ displacement half amplitude of the oscillating mass.

The average velocity will be the product of the step size, $d$, and the frequency in cycles rather than radians per unit time. That is:

$$v = df$$

$$f = \frac{\omega}{2\pi} \tag{13}$$

where

As an example, consider a case with the following operating conditions:

$m_1 = 700$ lbs.
$m_2 = 100$ lbs.
$\mu = 0.5$
$\alpha = 45°$
$\beta = 0$
$a = 4$ inches
$f = 282.22$ cycles/minute Using these values, we make the calculations described above which yield:

$A = 6.4$
$M = 0.125$
$MA = 0.800$
$\phi = 3.0$
$\psi = 0.3536$ now from the design chart (FIG. 4):

$$\frac{S}{\psi M} = 5.3 \text{ and}$$

therefore $S = 0.234$.

The actual cyclic step, therefore, is:
$d = a S = 0.937$

The average velocity is given by:
$v = f d = 264.4$ inches/minute.

Many different arrangements of mechanical components are possible to accomplish the shuffling mode of vibratory locomotion. Several plans for accomplishing the oscillation of the skid-mounted mass, in a direction inclined to the vertical, follow.

Figure 4:
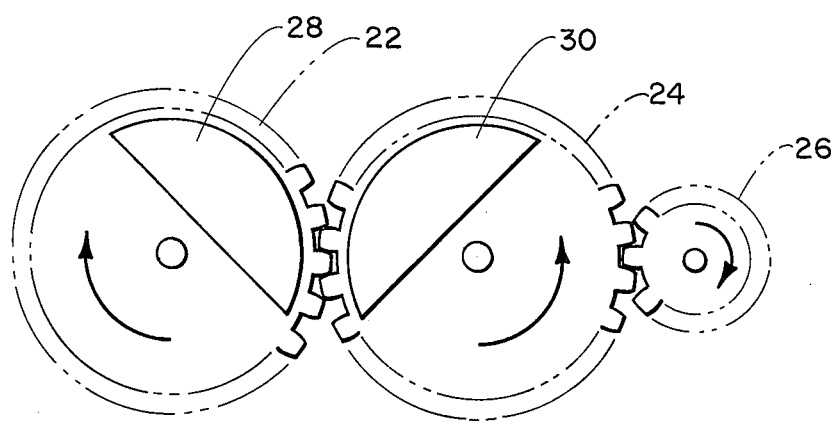
FIG. 4 is a side elevation illustrating the principles of the counter-rotating eccentric weights embodiment of the invention.
Figure 5:
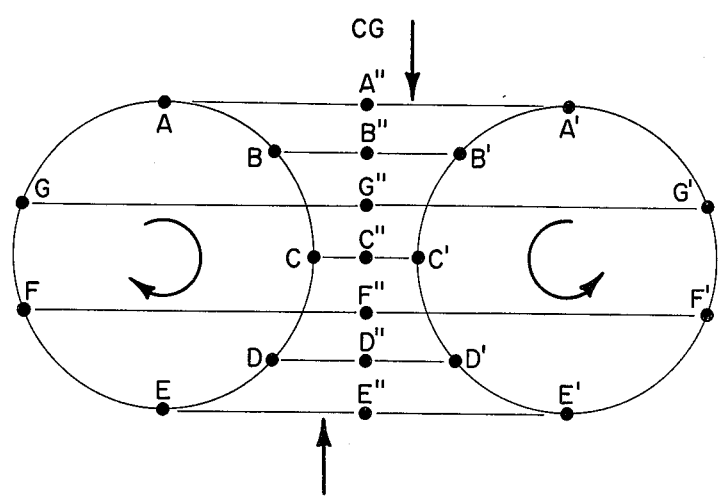
FIG. 5 is a diagrammatic drawing illustrating the net effect of the counter-rotating eccentric weights of FIG. 4.

In a preferred embodiment of the invention, the oscillator is comprised of counter-rotating, eccentric weights, which is a known type of high-power mechanical oscillator. The manner in which the counter-rotating, eccentric oscillator operates is illustrated in FIGS. 4 and 5. This oscillator produces the same effect as oscillating a mass along a straight line.

FIG. 4 shows two large gears 22, 24 meshing and driven by a pinion gear 26. If the pinion gear 26 rotates clockwise, then the next gear 24 rotates counterclockwise, and the last gear 22 clockwise. Attached to the two large gears, in any suitable manner, are two eccentric weights 28, 30 of equal mass. Since the two large gears 22, 24 and the pinion 26 are balanced, only the eccentric weights 28, 30 constitute any unbalance.

The diagram of FIG. 5 shows conceptually the successive position of the centers of gravity, designated A″ through G″, of the two weights 28, 30 as the two large gears 22, 24 counter rotate. The points designated A through G and A′ through G′ represent the motion of the centers of mass of the two weights, respectively. With the weights beginning at the positions designated A–A′, and successively moving to positions B–B′, C–C′, and so on, it can be seen that the center of gravity (CG) of the two weights moves from A″ to E″ and back to A″. Thus, the simple counter-rotating, eccentric oscillator has, as its net effect, the sinusoidal oscillation of the mass of the two weights 28, 30 in a straight line; precisely the correct form for use in vibratory locomotion.

Figure 6:
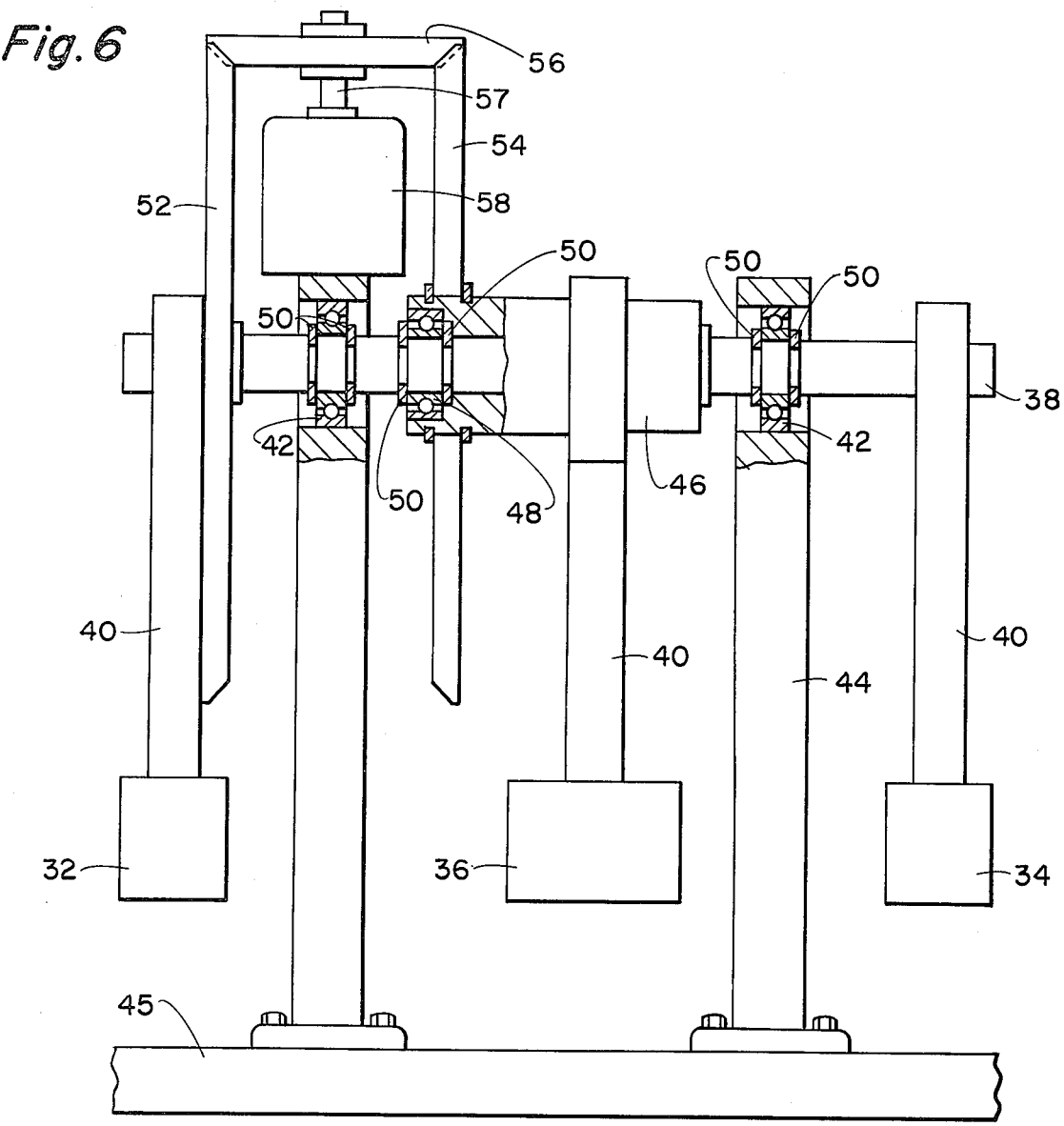
FIG. 6 illustrates in somewhat schematic form one method of construction of the counter-rotating eccentric weights embodiment of FIG. 4.

Many variations of this basic oscillator idea are possible and, in fact, quite practical. A particularly compact form is to place the weights on concentric shafts, as shown schematically in FIG. 6. The most convenient method to keep everything balanced is to divide one of the weights. Thus, in FIG. 6 the two outside weights 32, 34 are of equal mass, and combined, equal the mass of the center weight 36. The outside weights are connected to the inside concentric shaft 38 by legs 40 and rotate with the concentric shaft. The inside concentric shaft 38 is supported by bearings 42 on a pair of posts 44, attached firmly to the frame at 45 to be vibrated.

The center concentric weight 36 is connected by a leg 40 to the hollow outside concentric shaft 46 which rides on two bearings 48 on the inner concentric shaft. Collars 50 attached to the inner concentric shaft 38 with set screws keep the hollow outer concentric shaft 46 in place and in position with respect to the bearings. Two bevel gears 52, 54 are fastened to the hollow shaft and inner shaft, respectively, and are held in place by set screws and keys, as is typical. A pinion gear 56 engages the two bevel gears 52, 54 and is mounted on the shaft 57 of a hydraulic motor 58. Hoses (not shown) supply hydraulic fluid to the motor 58 and are fastened (or strapped) to the side of the support post 44. The hydraulic motor 58 is bolted to the top of the support post 44.

When the hydraulic motor 58 rotates, the center eccentric weight 36 rotates in one direction while the outer eccentric weights 32, 34 rotate in the opposite direction.

Figure 7:
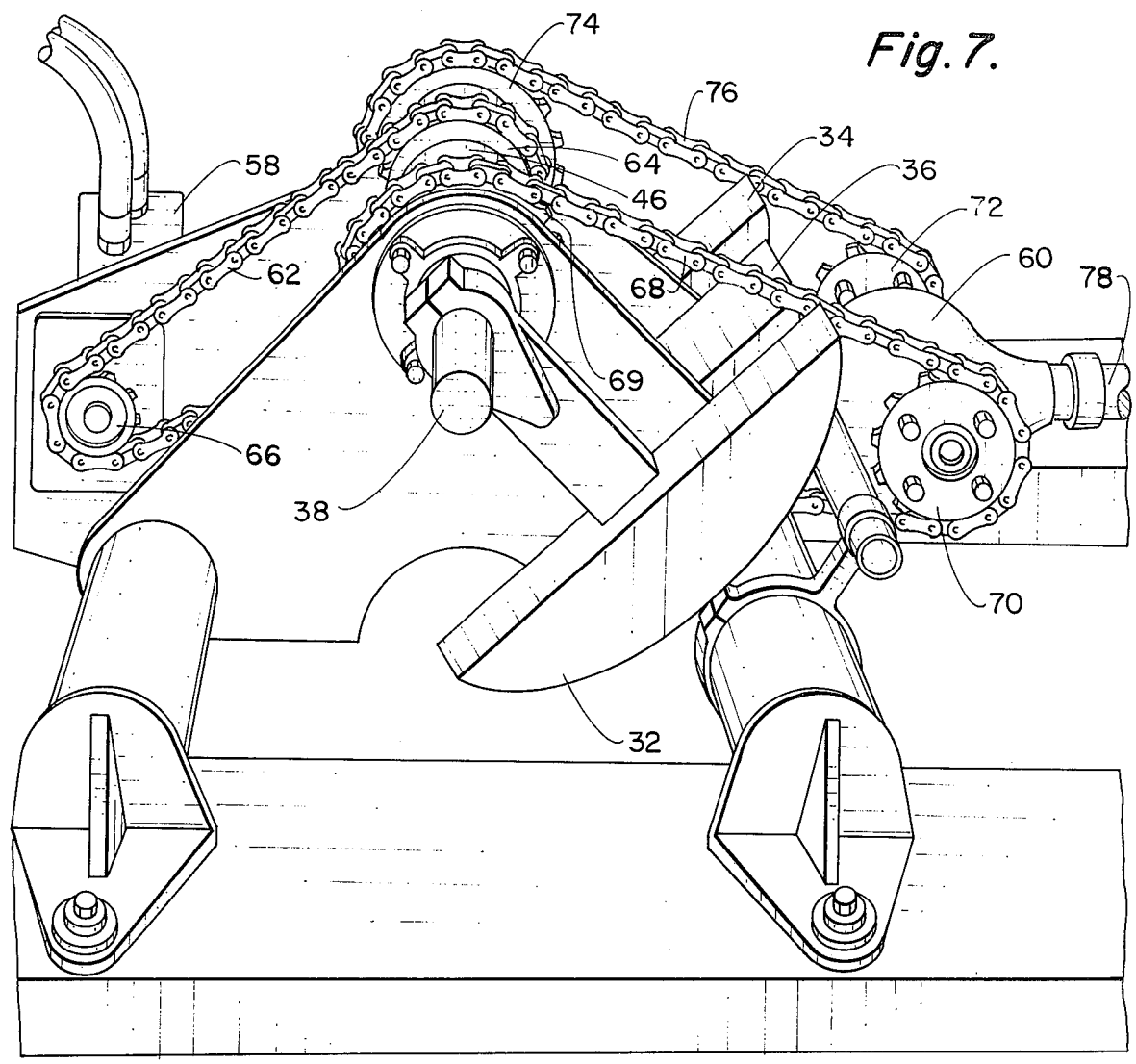
FIG. 7 is a side elevation of a practical model similar to the counter-rotating eccentric weight embodiment of FIG. 6, actually constructed and successfully tested.

A practical embodiment of the oscillator described above is shown in FIG. 7. In this case, an automobile differential 60 is used to produce the counter rotation of the three eccentric weights 32, 34, 36. A hydraulic motor 58 drives the center weight 36 by a chain 62, engaging a sprocket 64 on the hollow shaft 46 and a sprocket on the motor shaft 66. A second chain 68 connects a sprocket at the other end of the hollow shaft 46 to a sprocket 70 on the automobile differential 60. A sprocket 72, on the opposite end of the differential 60, is connected to a sprocket 74 on the inner shaft 38 by yet a third chain 76. When the second chain 68 is turning in one direction, the third chain 76 will turn on the opposite direction (and, hence, the outer eccentric weights 32, 34) as long as the drive shaft 78 is locked to prevent its turning. The advantage of this arrangement is that the shake (vibration) angle, α (FIG. 1), can be varied by merely releasing the drive shaft 78, turning it to vary the angle at which coincidence of the three eccentric weights occurs and then relocking it. In FIG. 7, the drive shaft is locked so that the shake angle is approximately 45° and the center of gravity travels from right to left which would be the forward direction of travel of the vehicle. To reverse the direction of the vehicle, the shake angle, α, would begin at the left and the center of gravity would travel from left to right. (This can be visualized by viewing a mirror image of FIG. 7.) Thus, by merely turning the drive shaft, the forward or reverse shake angle, α, can be varied from almost vertical to near horizontal. The optimum shake angle, α, depends upon the type of terrain over which the vehicle is traveling. That is, whether the vehicle is traveling uphill or downhill, or over smooth or rough terrain. This is apparent from equation (10) which has the variables of coefficient of friction, $\mu$, and angle of inclination, $\beta$.

Figure 8:
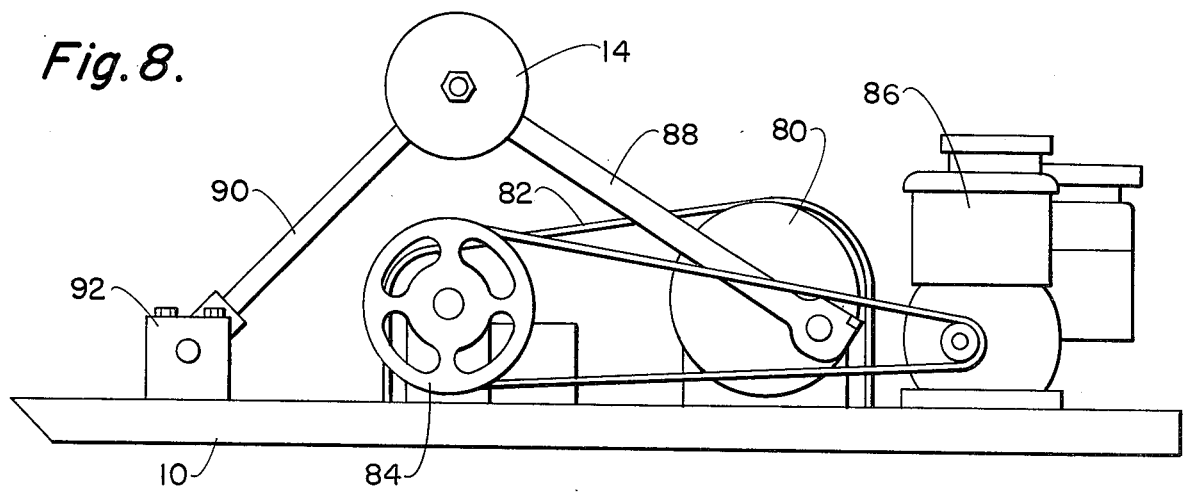
FIG. 8 is a side elevation in schematic form illustrating a link supported crank oscillating mode of the invention.

One of the simplest arrangements is the link-supported, crank-driven oscillator for vibrating the mass, as shown in FIG. 8. A crank 80, connected through a series of gears 82 to a pulley 84, which in turn is connected to a motor 86, rotates when the motor is energized. The series of gears reduces the frequency of rotation to an optimum value. A link 88 is attached to the crank 80 and another link 90, and causes the latter link 90 to oscillate back and forth as the crank 80 rotates. The latter link 90 pivots on an anchor 92 which is attached to the skid 10. The skid 10 might be three feet long and eighteen inches wide by approximately 2 inches thick. The vibrating mass 14 is attached to the intersection of the link 88 attached to the crank 80, and the pivoting link 90 attached to the anchor 92 and, as a result of the rotation of the crank 80, oscillates back and forth in a direction nearly perpendicular to the axis of the link 90 attached to the anchor 92. Thus, the mass 14 is forced to oscillate in substantially a straight line direction inclined to the horizontal.

Another embodiment of the invention can be envisioned which incorporates a scotch yoke mechanism, as shown in FIG. 9, which assures a straight line oscillation of the mass. A link 94 is affixed to the shaft 96 of a motor 98 such that it rotates with the shaft 96. A roller 100, or cam-follower bearing, is affixed to the other end of the link. A roller rolls relatively frictionlessly in the slot in a slide 102, which is in turn rigidly attached to a shaft 104. The shaft 104 slides freely in bearings 106, 108, which are rigidly fixed to a frame 110, which in turn if fixed to the skid 10. The mass 14 is attached to the shaft 104 in a rigid fashion between the bearings 106, 108. Thus, the rotation of the link 94 by the motor 98 will cause the roller 100 to force the shaft 104 to undergo a back and forth sinusoidal oscillation through the slide 102, attached to the end of the shaft 104. The mass 14, rigidly attached to the shaft 104, thus undergoes the required sinusoidal oscillation motion in a straight line direction inclined to the horizontal.

Figure 10:
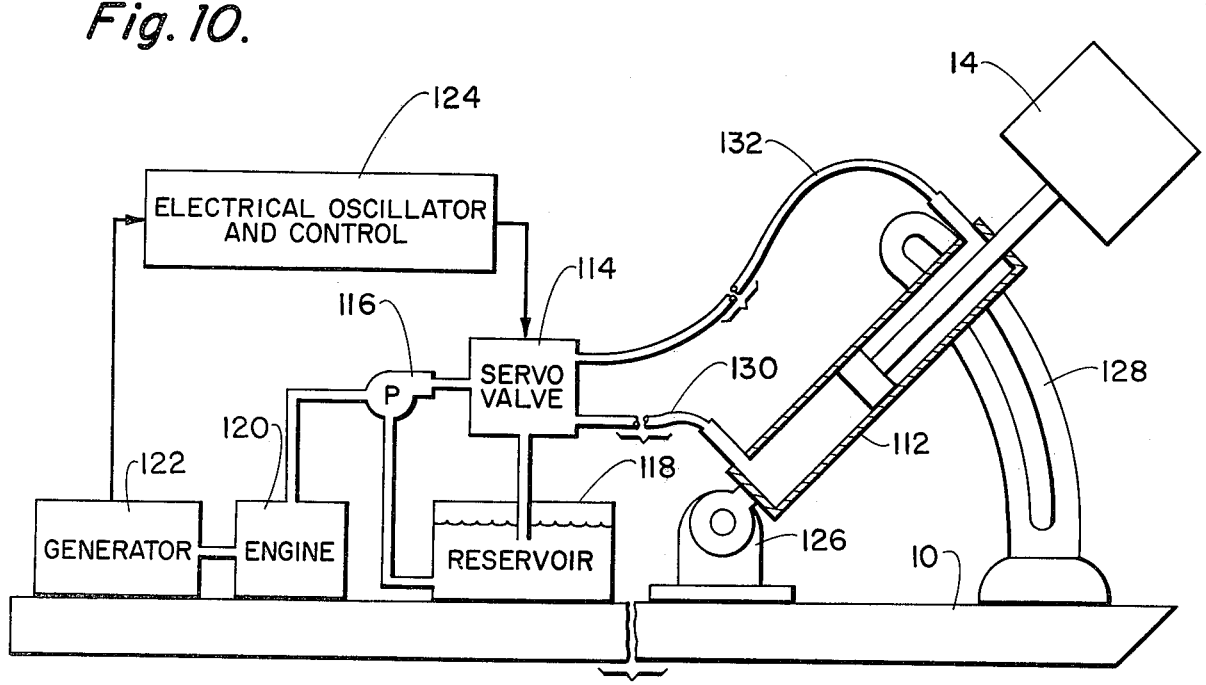

Hydraulic systems can also be used as mechanical oscillators, as illustrated in FIG. 10. They have an inherent attribute in that any number of cylinders can be controlled from the same source and, hence, phasing of several masses can be controlled.

In a typical electro-hydraulic embodiment (shown in schematic form in FIG. 10), the weight 14 to be oscillated is attached to a double-acting hydraulic cylinder 112 which will oscillate it. The hydraulic cylinder 112 is connected to an electro-hydraulic servo valve 114 which receives high pressure fluid from a pump 116 and discharges return fluid to a reservoir 118. The supply to the pump 116 is from the reservoir 118. An internal combustion engine 120 drives pump 116 and a generator 122 to supply power to an electrical oscillator and control unit 124. The oscillator and control unit 124 develops an electrical signal to control the electro-hydraulic servo 114. Such electro-hydraulic systems are readily available from commercial manufacturers such as MTS Systems, Wyle Laboratories, Gilmore Industries, and many others.

One end of the hydraulic cylinder 112 is rotatably connected to an anchor 126, which is rigidly attached to the skid 10. The other end of the cylinder 112 is connected to a slider 128, which is also rigidly affixed to the skid 10, and permits adjustment of the inclination of the hydraulic cylinder 112 to which it is adjustably connected. The aforementioned oscillatory motion of the mass is adjustably inclined to the horizontal and undergoes the required oscillatory motion. Control of the amplitude of the oscillation is produced by alternating the hydraulic input to the lines 130, 132 at the top and bottom of the cylinder 112 in such a manner as to restrict the motion of the piston assembly to something less than the full length of the cylinder 112.

Figure 11:
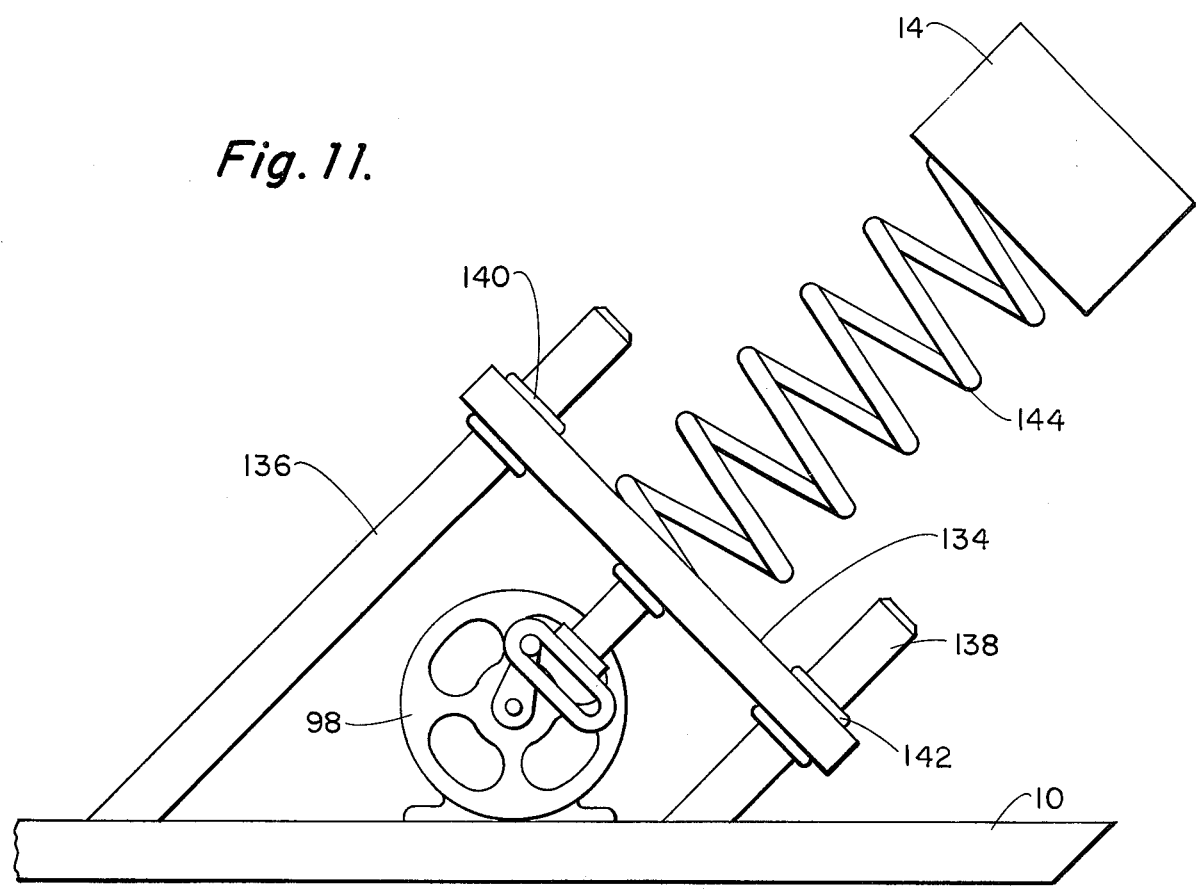
FIG. 11 is a side elevation of a base-driven resonant spring oscillating mode of the invention.

Another embodiment of the invention employs a base-driven, resonant spring system which is illustrated in FIG. 11. A flat base 134, supported by at least two inclined guide shafts 136, 138 on bearings 140, 142 is attached to a motor 98 by a scotch yoke type of arrangement, as described with respect to FIG. 9. The flat plate 134 is caused to execute a sinusoidal oscillation as the shaft of the motor turns by sliding on the guide shafts 136, 138 through the relatively frictionless slide bearings 140, 142. The guide shafts 136 138 are rigidly attached to the skid 10, as is also the motor 98. A spring 144 is rigidly attached to the plate 134 and to a mass 14. The plate 144 is caused to execute a sinusoidal oscillation as the shaft of the motor 98 turns. When the plate 134 is set into oscillation at the resonant frequency of the combination of the mass 14 and the spring 144, large excursions of the mass 14 ensue; thus, the system achieves the desired characteristic, causing the mass to sinusoidally oscillate in a direction inclined to the horizontal Although excitation at other frequencies could cause the spring to deflect in the transverse direction, the motor speed is to be so controlled that excitation is only provided at the correct frequency for axial spring motions. It is a comparatively simple matter to size the spring to achieve this result.

Figure 12:
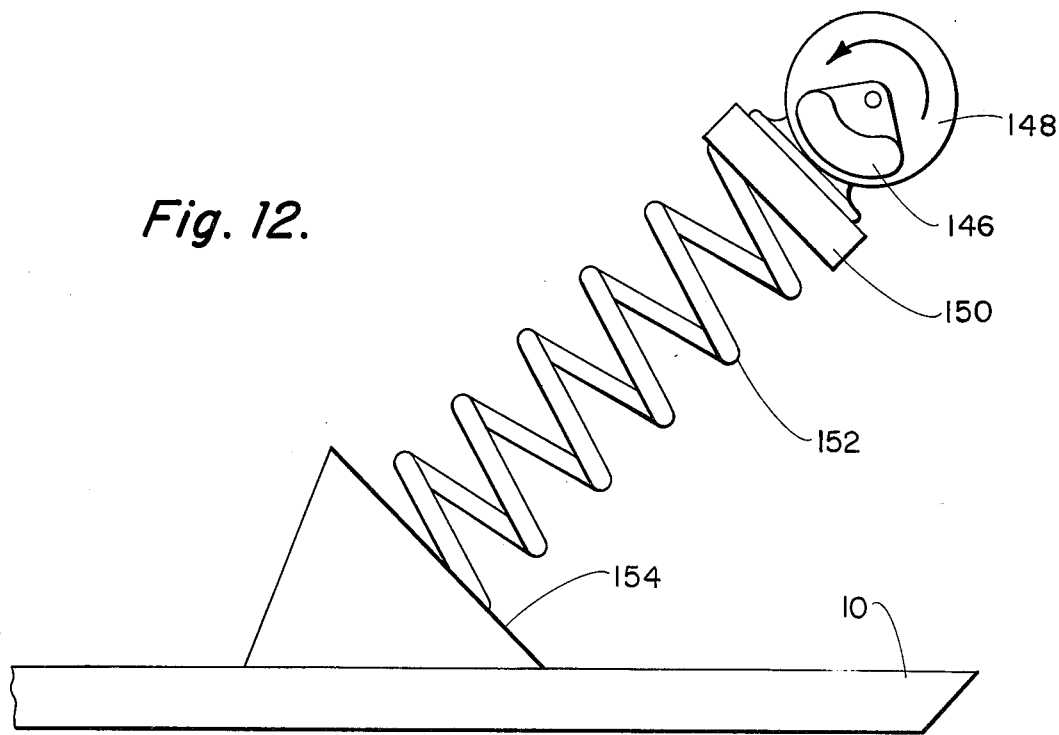
FIG. 12 is a side elevation of a reaction-drive resonant spring oscillating mode of the invention.

FIG. 12 illustrates another embodiment of the invention in which a reaction-driven, resonant spring is utilized. At least one eccentric mass 146 is affixed to the shaft of the motor 148 such that it rotates with the shaft and thereby produces an unbalanced force. The motor 148 is mounted through a plate 150 onto a spring 152 which in turn is rigidly affixed to the base 154 at a particular angle. The base 154 is rigidly attached to at least one skid 10. The spring is sized so that the axial natural frequency of the motor-plate-spring system coincides with the motor speed and a resonant condition results. Thus, when the motor 148 attains speed, large amplitude vibrations of the motor, plate and spring result. The motor, plate and eccentric weight, therefore, become an oscillating mass, oscillating with a direction inclined to the horizontal. The spring, as shown, is also capable of deflection perpendicular to its axis, but it is a simple matter to design the spring so that the natural frequency of this transverse motion is far different from the motor speed so that no transverse resonant condition develops and, hence, only negligible transverse motion results.

Figure 13:
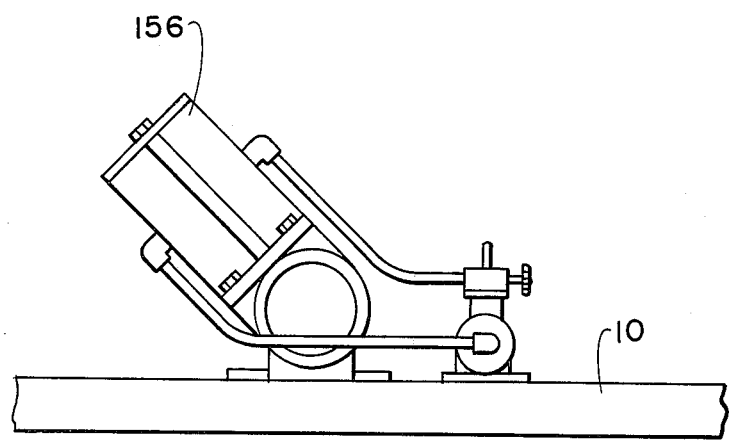
FIG. 13 is a schematic view of an embodiment using a compressed air driven vibrator for the oscillating mass.

Another embodiment of the invention employs a vibrator 156 driven by compressed air, as shown in FIG. 13. The vibrator 156 is comprised of a cylinder having a massive piston driven by compressed air against an air cushion, with no impact. The vibrator 156 is attached to the slid 10 such that the angle of inclination, $\alpha$, can be varied. A successful vibratory locomotion vehicle was built using an air cushion-no impact vibrator, having a 66-pound piston and 1.7 inch stroke, manufactured by the Cleveland Vibrator Company.

Figure 14:
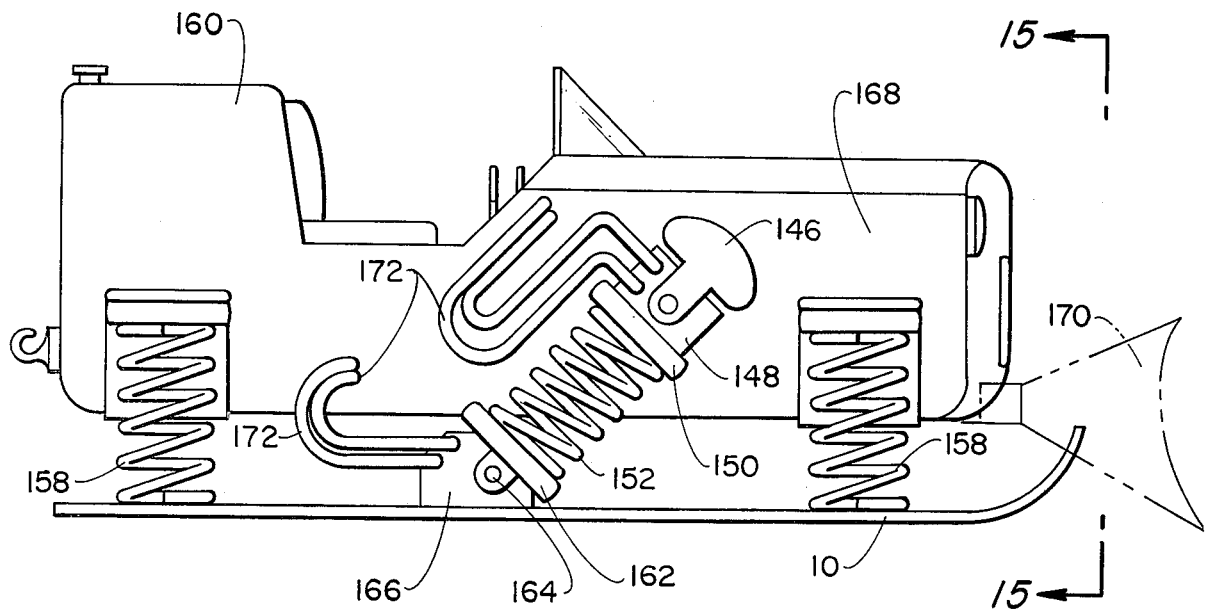
FIG. 14 is a side elevation of a specific embodiment of the invention utilizing the resonant spring oscillating method of FIG. 12.
Figure 15:
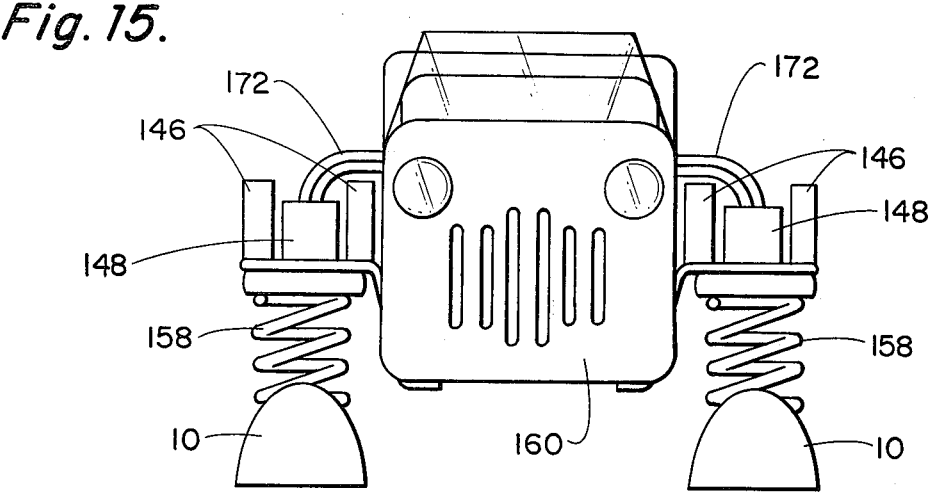
FIG. 15 is a front elevation of the specific embodiment of FIG. 14.

FIG. 14 is an example of a tractor built around the vibratory locomotion concept and utilizing the reaction-driven, resonant spring embodiment. The tractor body 160 is suspended on four relatively soft, suspension springs 158 configured such that buckling of the springs does not occur. Each pair os suspension springs 158 is attached to a skid 10 at the bottom so that the skids can oscillate without transmitting the oscillatory motion to the tractor body. There are two skids, one on each side of the tractor body 160 (see FIG. 15) mounted in the fashion just described. Each skid operates as follows: One or more eccentric weights 146 (two are shown in FIG. 15) are rotated by a hydraulic motor 148, or the like, which is attached to a mass 150. The mass 150 is bolted to an oscillator spring 152, which in turn is bolted to a spring base 162. The spring base 162 is connected to the shaft 164 of a hydraulic torque motor 166 which is connected solidly to the skid 10. The hydraulic motor 148 is rotated at the natural frequency of the mass, motor, eccentric weight combination resting on the spring 152. This causes the mass 150 to elongate the spring 152 with a relatively large motion and propels the skid 10 and, hence, the tractor, The eccentric weight 146 should be oscillated at the natural frequency of the motor-plate-spring system. Control of the amplitude of the oscillation of the mass 150 is accomplished by increasing the pressure to the hydraulic motor 148. The speed of the motor 148 must remain also constant to maintain the resonant condition of the mass and the spring. Additional control is accomplished by applying power, more or less, to each skid 10; the faster moving skid moves along the ground faster and rotates the vehicle. The torque motor 166 can rotate the whole spring-mass-motor-eccentric weight combination and change the angle of oscillation. If it is tilted backwards, the skid 10 will back up. For hard pulling and tough going, the spring 152 must be tilted forward, but in a relatively vertical position. For easy going, the forward tilt can be increased which will increase the velocity. That is, the whole spring-mass-motor-eccentric weight combination would be tilted closer to a horizontal position.

The suspension springs 158 are required to isolate the payload from the incremental motion of the skids 10, and in the case of a two skid tractor, to permit independent operation of the two skids 10 (see FIG. 15). Simple vibration isolation theory is sufficient to provide a suitable suspension system. Such a system should have a natural frequency of less than half of the excitation frequency. For example, for a spring having a resonant frequency of two cycles per second and oscillation frequency of 3½ to 6 cycles per second for the eccentric weight was found suitable. Naturally there are many ways to do this. One successful method is to use unguided compression springs. The reference ("Mechanical Springs", by A. M. Wahl, 2nd ed. McGraw Hill 1963) gives very accurate theory for the performance of coil springs. Using this theory, a design for suspension springs can be achieved such that the vertical stiffness and fore and aft stiffness are low enough that when computing the natural frequencies by the familiar formula $$f_n = \frac{1}{2\pi} \sqrt{\frac{k}{M_p}}. \qquad (15)$$

the suspenson natural frequencies are less than half of the oscillator operating frequencies. In the above formula, $k$ is the suspension stiffness provided by the suspension springs. and $M_p$ is the total mass on the payload platform. Care must be exercised to guard against buckling of the springs, but the theory in the above mentioned reference covers this adequately. Shock absorbers (not shown) mounted through the center of the coil spring or in any suitable manner obvious to those skilled in the art would also probably be advantageous to dampen any bouncing which might be produced by the coil spring.

Control of the torque motors and eccentric weight motors is accomplished through valves (not shown) controlled in the cockpit which regulate the flow of hydraulic fluid through flexible lines 172. The engine compartment 168 contains an internal combustion engine to drive the hydraulic pump for the motors. A bulldozer blade might be connected approximately as is indicated by the phantom lines at 170.

Finally, the system is envisioned as a supplementary locomotion means for fulldozers, tractors and the like. For example, the reaction-driven resonant spring embodiment illustrated in FIG. 14 can be added to a bulldozer, on either side above or adjacent the tracks, to provide locomotion in cases where the tracks bog down. The vibratory locomotion system then can be brought into play to pull the bulldozer or tractor out of the mire. Thus, the vibratory locomotion system is not limited to vehicles mounted on skids but can be used as an assist system on various types of vehicles with a variety of existing drive systems.

Thus, there has been disclosed a novel vibratory locomotion means which has an almost countless number of applications as a primary or secondary locomotion means which will be obvious to those skilled in the art.

Obviously, many modifications and variations of the present invention are possible in the light of the above teachings. It is therefore to be understood that within the scope of the appended claims the invention may be practiced otherwise than as specifically described.

What is claimed is.

1. A vibratory locomotion system for a vehicle comprising:
   a payload;
   means fur supporting said payload resting on the ground;
   at least one weight having a predetermined mass attached to the payload and supporting means;
   means for vibrating said weight with sinusoidal oscillations of predetermind frequency to produce a vibration in a direction nonparallel to the direction of travel of said payload; and
   means for adjusting the angle at which the weight is vibrated with respect to the supporting means.

2. The vibratory locomotion system of clain 1 wherein:
   the vibrating weight is comprised of at least two balanced eccentric weights of equal mass; and
   the vibrating means is comprised of means for counter-rotating the eccentric weights so that the center of gravity of the eccentric weights oscillates sinusoidally in a straight line.

3. The vibratory locomotion system of claim 2 wherein the balanced eccentric weights are comprised of:
   three eccentric weights; said eccentric weights being mounted adjacent each other on concentric shafts with two of the weights being mounted on opposite ends of an inner concentric shaft equidistant and on either side of a center weight mounted on an outer concentric shaft; the two weights on the inner concentric shaft being of equal mass and having a combined mass equal of the center weight.

4. The vibratory locomotion system of claim 3 wherein the vibrating means is comprised of:
   a hydraulic motor;
   a pinion gear attached to the shaft of the hydraulic motor;
   a first bevel gear attached to the inner concentric shaft and engaging the pinion gear to rotate the inner concentric shaft;
   a second bevel gear attached to the outer concentric shaft and engaging the pinion gear to rotate the outer concentric shaft in a direction counter to the inner concentric shaft.

5. The vibratory locomotion system of claim 3 wherein the vibrating means is comprised of:
   a hydraulic motor;
   a sprocket attached to the shaft of the hydraulic motor;
   a first sprocket attached to the outer concentric shaft;
   a chain connecting the hydraulic motor sprocket to the first sprocket;
   a second sprocket attached to the opposite end of the outer concentric shaft;
   a differential;
   a first sprocket attached to one end of the differential;
   a chain connecting the second sprocket on the outer concentric shaft to the first sprocket on the differential;
   a second sprocket on the opposite end of the differential;
   a sprocket attached to the inner concentric shaft; and
   a chain connecting the second sprocket on the differential to the sprocket on the inner concentric shaft wheeby operation of the hydraulic motor produces counter-rotation of the two weights attached to the outer concentric shaft with the center weight.

6. The vibratory locomotion system of claim 5 wherein the means for adjusting the vibration angle of the weights comprises:
   a drive shaft attached to the differential;
   means for locking the drive shaft; and
   means for releasing and relocking the drive shaft so that the angle of coincidence of the three weights can be adjusted.

7. The vibratory locomotion system of claim 1 wherein the means for vibrating the weight comprises:
   a motor;
   a crank adapted to be rotated by the motor;
   a first link connected to the crank;

a second link anchored to the vehicle; said weight being connected at the intersection of the first and second links so that rotation of the crank vibrates the weight to produce a sinusoidal oscillation in substantially a straight line.

8. The vibratory locomotion system of claim 7 wherein the means for vibrating the weight comprises:
a motor;
a link attached to the motor and adapted to rotate;
a roller attached to the free end of the rotating link;
a slide having a slot engaging the roller;
a shaft rigidly attached to the slide;
a frame rigidly attached to the vehicle and supporting the shaft on bearings permitting the shaft to slide freely; said weight being rigidly attached to the shaft so that rotation of the link vibrates the shaft and weight to produce sinusoidal oscillations in a straight line.

9. The vibratory locomotion system of claim 1 wherein the means for vibrating the weight comprises:
a double-acting hydraulic cylinder with the weight rigidly connected to the piston of the cylinder; and
an electro-hydraulic servo system connected to the hydraulic cylinder for driving the cylinder so that the mass is sinusoidally oscillated in a straight line.

10. The vibratory locomotion system of claim 9 wherein the means for vibrating the weight comprises:
a flat base;
at least two inclined guide shafts supporting said base on bearings permitting the base to slide on the guide shafts;
a motor;
a scotch yoke assembly connecting said motor to said flat base;
a spring of predetermined resonant frequency attached to said base; said weight rigidly attached to the opposite end of the spring so that operation of the motor oscillates the base to produce sinusoidal oscillations on the spring and weight in a straight line.

11. The vibratory locomotion system of claim 1 wherein the means for vibrating the weight comprises:
an inclined base attached to the vehicle;
a spring of predetermined resonant frequency attached to the inclined base;
a plate attached to the oppsoite end of the spring;
a motor rigidly attached to the plate;
at least one eccentric weight attached to the shaft of the motor so that operation of the motor rotates the eccentric weight to produce sinusoidal oscillations of the motor-plate-spring system in a straight line.

12. The vibratory locomotion system of claim 1 wherein the means for vibrating the weight comprises:
a compressed air driven vibrator.

13. The vibratory locomotion system of claim 11 wherein:
the payload is comprised of a tractor body;
the means for supporting the payload is comprised of two skids mounted on either side of the tractor body; each of said skids being attached to the tractor body by two suspension springs at the front and rear; and
each skid has a vibrating weight system pivotally attached to a hydraulic motor which in turn is rigidly attached to the skid; said hydraulic motor adapted to vary the angle of inclination of the vibrating weight system from a nearly horizontal position to a vertical position in the forward or rearward direction.

14. The vibratory locomotion system of claim 13 wherein the suspension springs are selected to have a natural frequency of less than half the operating frequency at which the weight is to be oscillated.

15. The vibratory locomotion system of claim 1 wherein the mass of the vibrating weight is between approximately 5 to 20% of the gross vehicle weight.

16. A method of vibratory locomotion for a vehicle comprising:
mounting at least one weight of predetermined mass on the vehicle;
producing a vibration in a direction nonparallel to the direction of travel of the vehicle by vibrating the weight at a predetermined frequency of oscillation;
isolating the body of the vehicle from the vibrations of the weight; and
adjustably inclining the mass to produce locomotion.

17. The method of claim 16 wherein the vibration frequency of the weight is such that;
$$MA \leq 1.0$$
where
$M =$ the mass of the weight divided by the total mass of the vehicle and weight
$A =$ the intensity of the vibration amplitude.

18. The method of claim 15 wherein the vibration frequency of the weight is such that;
$$\phi MA > 1.0$$
where
$$\phi = \frac{\mu + \cot \alpha}{\mu + \tan \beta}$$
where
$\mu =$ coefficient of friction between the vehicle and the ground
$\alpha =$ angle of inclination of the vibrating weight
$\beta =$ angle of terrain.

19. The method of claim 18 wherein the angle of inclination of the vibrating is adjustable from near horizontal to near vertical in the forward or rearward direction.

20. The vibratory locomotion system of claim 19 wherein the means for supporting the payload comprise at least one skid.

21. The vibratory locomotion system of claim 20 wherein the vibrating weight is adjustably attached to the skid.

22. The vibratory locomotion system of claim 21 wherein the payload is connected to the skid by suspension springs to provide isolation from the oscillations of the vibratory weight.

* * * * *